United States Patent
Lin et al.

(10) Patent No.: US 12,537,446 B2
(45) Date of Patent: Jan. 27, 2026

(54) ADAPTIVE SLEW RATE RESONANT POWER CONVERTER AND CONVERSION CONTROL CIRCUIT AND CONTROL METHOD THEREOF

(71) Applicant: Richtek Technology Corporation, Hsinchu (TW)

(72) Inventors: Kun-Yu Lin, Hsinchu (TW); Hsin-Yi Wu, Yunlin (TW); Yu-Chang Chen, Nantou (TW); Fu-Ciao Syu, New Taipei (TW); Chia-Hsien Yang, Keelung (TW); Chien-Fu Tang, Hsinchu (TW); Ta-Yung Yang, Taoyuan (TW)

(73) Assignee: Richtek Technology Corporation, Hsinchu (TW)

( * ) Notice: Subject to any disclaimer, the term of this patent is extended or adjusted under 35 U.S.C. 154(b) by 226 days.

(21) Appl. No.: 18/433,417

(22) Filed: Feb. 6, 2024

(65) Prior Publication Data

US 2025/0030337 A1    Jan. 23, 2025

Related U.S. Application Data

(60) Provisional application No. 63/514,788, filed on Jul. 20, 2023.

(51) Int. Cl.
| H02M 3/00 | (2006.01) |
| H02M 1/00 | (2006.01) |
| H02M 1/08 | (2006.01) |
| H02M 3/335 | (2006.01) |

(52) U.S. Cl.
CPC ........... *H02M 3/01* (2021.05); *H02M 1/0058* (2021.05); *H02M 1/08* (2013.01); *H02M 3/33571* (2021.05); *H02M 3/33592* (2013.01)

(58) Field of Classification Search
CPC ............... H02M 3/01; H02M 3/33571; H02M 3/33592; H02M 1/08; H02M 1/0058
USPC ...................................................... 363/21.03
See application file for complete search history.

(56) References Cited

U.S. PATENT DOCUMENTS

| 2010/0232182 A1* | 9/2010 | Yang ................. H02M 3/33569 363/20 |
| 2018/0337607 A1* | 11/2018 | Drda ....................... H02M 1/08 |
| 2020/0007043 A1* | 1/2020 | Miao ....................... H02M 3/01 |
| 2024/0039389 A1* | 2/2024 | Chen ..................... H02M 1/083 |

* cited by examiner

*Primary Examiner* — Yemane Mehari
(74) *Attorney, Agent, or Firm* — Huan-Yi Lin

(57) ABSTRACT

A circuit of a resonant power converter comprising: a high-side switch and a low-side switch, coupled to form a half-bridge switching circuit which is configured to switch a transformer for generating an output voltage; a high-side drive circuit, generating a high-side drive signal coupled to drive the high-side switch in response to a high-side control signal; a bias voltage, coupled to a bootstrap diode and a bootstrap capacitor providing a power source from the bootstrap capacitor for the high-side drive circuit; wherein the high-side drive circuit generates the high-side drive signal with a fast slew rate to turn on the high-side switch when the high-side switch is to be turned on with soft-switching; the high-side drive circuit generates the high-side drive signal with a slow slew rate to turn on the high-side switch when the high-side switch is to be turned on without soft-switching.

23 Claims, 4 Drawing Sheets

ADAPTIVE SLEW RATE RESONANT POWER CONVERTER AND CONVERSION CONTROL CIRCUIT AND CONTROL METHOD THEREOF

CROSS REFERENCE

The present invention claims priority to U.S. 63/514,788, filed on Jul. 20, 2023.

BACKGROUND OF THE INVENTION

Field of Invention

The present invention relates to a resonant power converter. Particularly it relates to a resonant power converter having adaptive driver slew rate. The present invention also relates to a conversion control circuit and a control method for use in the resonant power converter.

Description of Related Art

The resonant power converter can provide soft-switching to achieve high efficiency, high power density, and low EMI performance. However, when the output voltage is still relatively low during power-on, the voltage of the resonant capacitor will be not sufficient to turn on the body diode of the high-side switch for soft-switching, the high-side switch may experience hard switching, which leads to high voltage stress on power devices and reduces the reliability of the power converter.

Compared to the prior art described above, the present discloses a control method and a conversion circuit to suppress the voltage spike caused by the hard switching of the resonant power converter using adaptive slew rate control.

SUMMARY OF THE INVENTION

From one perspective, the present invention provides a resonant power converter comprising: a high-side switch and a low-side switch, coupled to form a half-bridge switching circuit which is configured to switch a transformer for generating an output voltage; a high-side drive circuit, generating a high-side drive signal coupled to drive the high-side switch in response to a high-side control signal; a bias voltage, coupled to a bootstrap diode and a bootstrap capacitor providing a power source from the bootstrap capacitor for the high-side drive circuit; wherein the high-side drive circuit generates the high-side drive signal with a fast slew rate to turn on the high-side switch when the high-side switch is to be turned on with soft-switching; the high-side drive circuit generates the high-side drive signal with a slow slew rate to turn on the high-side switch when the high-side switch is to be turned on without soft-switching.

In one preferred embodiment, the high-side drive circuit generates the high-side drive signal with the slow slew rate when the bias voltage is lower than a threshold voltage; when the bias voltage is higher than the threshold voltage, the high-side drive circuit generates the high-side drive signal with the fast slew rate.

In one preferred embodiment, turning on of the low-side switch generates a first circulated current which achieves soft-switching for the high-side switch when the low-side switch is turned off.

In one preferred embodiment, the switching control circuit is configured to generate the high-side control signal to control the high-side switch and a low-side control signal to control the low-side switch.

In one preferred embodiment, the bias voltage is controlled to be lower than the threshold voltage if the output voltage of the power converter is lower than an under-voltage threshold, such that the high-side drive signal has the slow slew rate.

In one preferred embodiment, the bias voltage is lower than the threshold voltage during a power-on period of the output voltage, such that the high-side drive signal has the slow slew rate.

In one preferred embodiment, the high-side drive circuit controls a path resistance between the power source and a control terminal of the high-side switch to have a first resistance when the slow slew rate is required to turn on the high-side switch, and to have a second resistance when the fast slew rate is required to turn on the high-side switch, wherein the first resistance is larger than the second resistance.

In one preferred embodiment, the high-side drive circuit includes: plural transistors, coupled between the bias voltage and the control terminal of the high-side switch, wherein a first portion of the plural transistors is controlled to be conductive with the first resistance when the slow slew rate is required to turn on the high-side switch, and a second portion of the plural transistors is controlled to be conductive with the second resistance when the fast slew rate is required to turn on the high-side switch.

In one preferred embodiment, the plural transistors include a first transistor and second transistor, wherein the first transistor is controlled to be conductive when the slow slew rate is required to turn on the high-side switch, and the second transistor is controlled to be conductive when the fast slew rate is required to turn on the high-side switch, wherein an ON-resistance of the first transistor is larger than an ON-resistance of the second transistor.

In one preferred embodiment, the high-side drive circuit includes a resistor coupled to the first portion of the plural transistors, wherein the resistor is configured to increase the path resistance when the slow slew rate is required to turn on the high-side switch.

From one perspective, the present invention provides a conversion control circuit for controlling a resonant power converter, wherein the resonant power converter includes: a high-side switch and a low-side switch, coupled to form a half-bridge switching circuit which is configured to switch a transformer for generating an output voltage, wherein the conversion control circuit comprises: a high-side drive circuit, generating a high-side drive signal coupled to drive the high-side switch in response to a high-side control signal; a switching control circuit, configured to generate a bias voltage, the high-side control signal and a low-side control signal according to the output voltage, wherein the bias voltage is coupled to a bootstrap diode and a bootstrap capacitor for providing a power source from the bootstrap capacitor for the high-side drive circuit, wherein the low-side control signal is configured to control the low-side switch; wherein the high-side drive circuit generates the high-side drive signal with a fast slew rate to turn on the high-side switch when the high-side switch is to be turned on with soft-switching, wherein the high-side drive circuit generates the high-side drive signal with a slow slew rate to turn on the high-side switch when the high-side switch is to be turned on without soft-switching.

From one perspective, the present invention provides a control method for controlling a resonant power converter, wherein the resonant power converter includes: a high-side switch and a low-side switch, coupled to form a half-bridge switching circuit which is configured to switch a transformer for generating an output voltage; and a high-side drive circuit, generating a high-side drive signal coupled to drive the high-side switch in response to a high-side control signal; wherein the control method comprises: generating a bias voltage, wherein the bias voltage is coupled to a bootstrap diode and a bootstrap capacitor for providing a power source from the bootstrap capacitor for the high-side drive circuit; generating the high-side control signal and a low-side control signal according to the output voltage, wherein the low-side control signal is configured to control the low-side switch; controlling the high-side drive circuit to generate the high-side drive signal with a fast slew rate to turn on the high-side switch when the high-side switch is to be turned on with soft-switching; and controlling the high-side drive circuit to generate the high-side drive signal with a slow slew rate to turn on the high-side switch when the high-side switch is to be turned on without soft-switching.

In one preferred embodiment, the step of generating the high-side drive signal includes: controlling the high-side drive circuit to generate the high-side drive signal with the slow slew rate when the bias voltage is lower than a threshold voltage; and controlling the high-side drive circuit to generate the high-side drive signal with the fast slew rate when the bias voltage is higher than the threshold voltage.

In one preferred embodiment, the step of generating the bias voltage includes: controlling the bias voltage to be lower than the threshold voltage if the output voltage of the power converter is lower than an under-voltage threshold, such that the high-side drive signal has the slow slew rate.

In one preferred embodiment, the step of generating the bias voltage includes: controlling the bias voltage to be lower than the threshold voltage during a power-on period of the output voltage, such that the high-side drive signal has the slow slew rate.

In one preferred embodiment, the step of generating the high-side drive signal includes: controlling a path resistance between the power source and a control terminal of the high-side switch to have a first resistance when the slow slew rate is required to turn on the high-side switch; and controlling the path resistance to have a second resistance when the fast slew rate is required to turn on the high-side switch; wherein the first resistance is larger than the second resistance.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
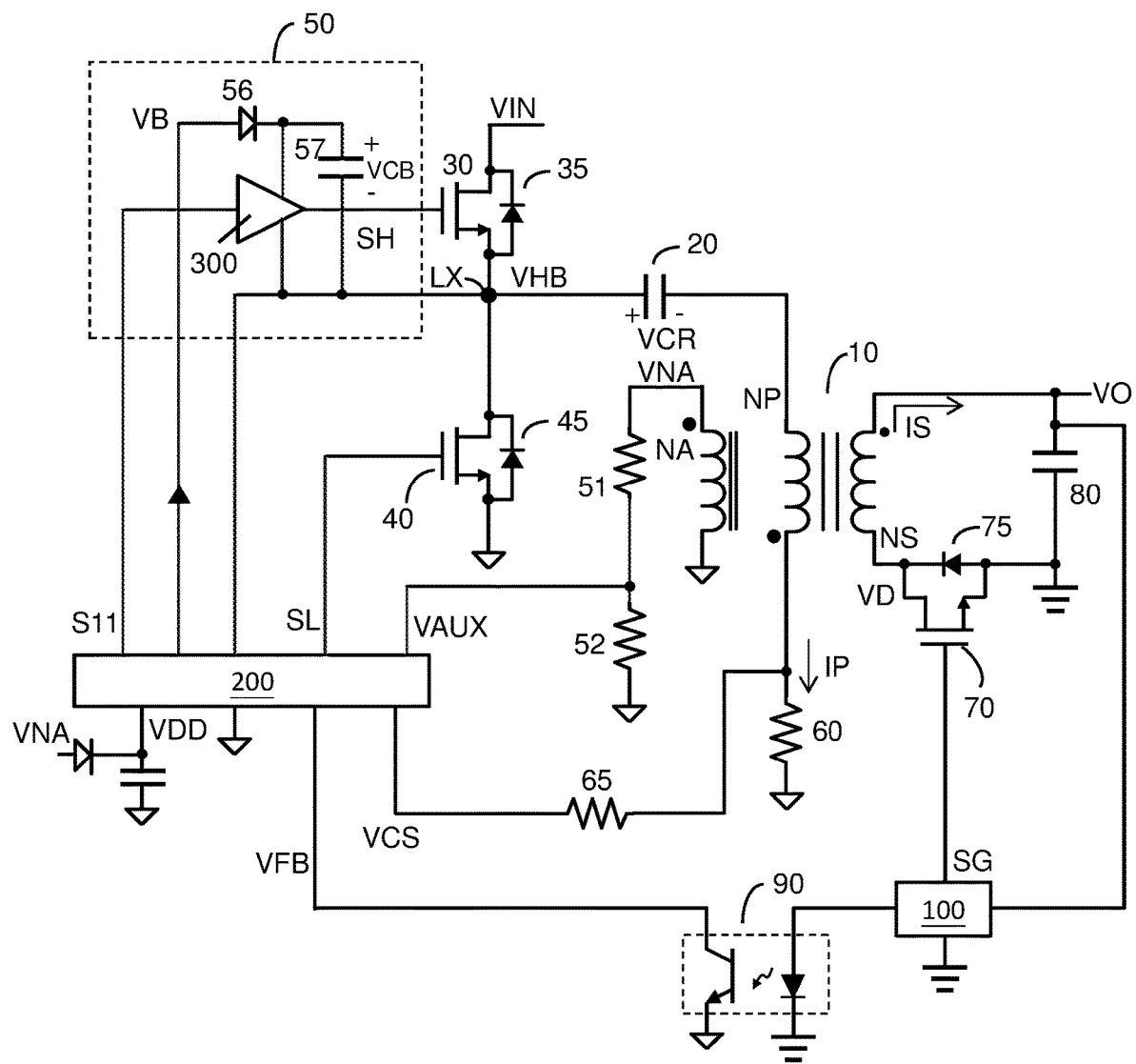
FIG. 1 shows a schematic diagram of an embodiment of the resonant power converter according to the present invention.

FIG. 1 represents a preferred embodiment of a resonant power converter according to the present invention. A half-bridge circuit is formed by a transistor 30 (i.e., high-side switch) and a transistor 40 (i.e., low-side switch). Connected in series to the output (i.e., switching node LX) of the half-bridge circuit is a transformer 10 and a resonant capacitor 20 which are coupled in series. The transformer 10 consists of a primary winding NP, a secondary winding NS, and an auxiliary winding NA. A primary-side controller 200 generates a high-side control signal S11 and a signal SL. A high-side drive circuit 300 generates a signal SH based on the high-side control signal S11. Both the signal SH and the signal SL are utilized to switch the transformer 10 through the half-bridge circuit, generating an output voltage VO on the secondary side of the transformer 10. A resistor 60 is connected to detect the primary switching current IP of the transformer 10, generating a current-sense signal VCS. The generation of the signals SH and SL is responsive to a feedback signal VFB, which is determined by the output power of the power converter. More specifically, a secondary-side controller 100 is linked to the output voltage VO to generate the feedback signal VFB. The feedback signal VFB is further transmitted to the primary-side controller 200 through an opto-coupler 90. The secondary-side controller 100 also generates a secondary-side drive signal SG to operate the synchronous rectifier transistor 70 during the demagnetizing period TDS of the transformer 10. During the switching of the transformer 10, the auxiliary winding NA generates an auxiliary winding signal VNA. Resistors 51 and 52 attenuate the auxiliary winding signal VNA to generate a signal VAUX connected to the primary-side controller 200. The voltage level of the VAUX signal corresponds to the voltage level of the output voltage VO.

The signal SH is responsible for magnetizing the transformer 10 by driving the transistor 30. During the demagnetizing and resonant periods of the transformer 10, the signal SL turns on the transistor 40. Turning-on of the transistor 40 is also applied to generate a circulating current through the transformer 10, achieving zero voltage switching (ZVS) for the transistor 30. The voltage VCR of the resonant capacitor 20 is related to the output voltage VO.

However, in some circumstances, for example during the power-on period, as the output voltage VO increases from a low voltage, such as zero voltage, the voltage VCR of the resonant capacitor 20 becomes too low to generate sufficient circulating current for achieving soft-switching or ZVS for the transistor 30. If the switching slew rate is high at the gate of the transistor 30 under this situation, the hard switching of transistor 30 will result in a high voltage spike on synchronous rectifier transistor 70 during the switching of the transformer 10.

In one embodiment according to the present invention, the primary-side controller 200 is configured to generate a bias voltage VB from a voltage VDD. In one embodiment, the voltage VDD is generated by rectifying the auxiliary winding signal VNA. The bias voltage VB is connected to a bootstrap diode 56 and a bootstrap capacitor 57, by switching the transistor 40, providing a level-shift (i.e., also known as bootstrap) bias power VCB on the bootstrap capacitor 57 for the high-side drive circuit 300. In one embodiment, the high-side drive circuit 300 generates the signal SH with a fast slew rate to turn on transistor 30 when soft-switching for the transistor 30 is intended, which improves switching efficiency. Conversely, when turning on the transistor 30 without soft-switching (or soft-switching for the transistor 30 is not achievable due to the aforementioned reason), the high-side drive circuit 300 generates the signal SH with a slow slew rate, which prevents the high stress of the transistors as described above.

By generating varying levels of bias voltage VB, the primary-side controller 200 signals the high-side drive circuit 300 to generate the SH signal with either a fast slew rate or a slow slew rate. Note that, the SH signal with the fast slew rate has a higher rising and/or falling slope than with the slow slew rate. In one embodiment, when the bias voltage source VCB is below a threshold voltage VTL, the high-side drive circuit 300 generates the SH signal with a slow turn-on slew rate. On the other hand, when the bias voltage source VCB exceeds the threshold voltage VTL, the high-side drive circuit 300 generates the SH signal with a fast turn-on slew rate.

Figure 2A:
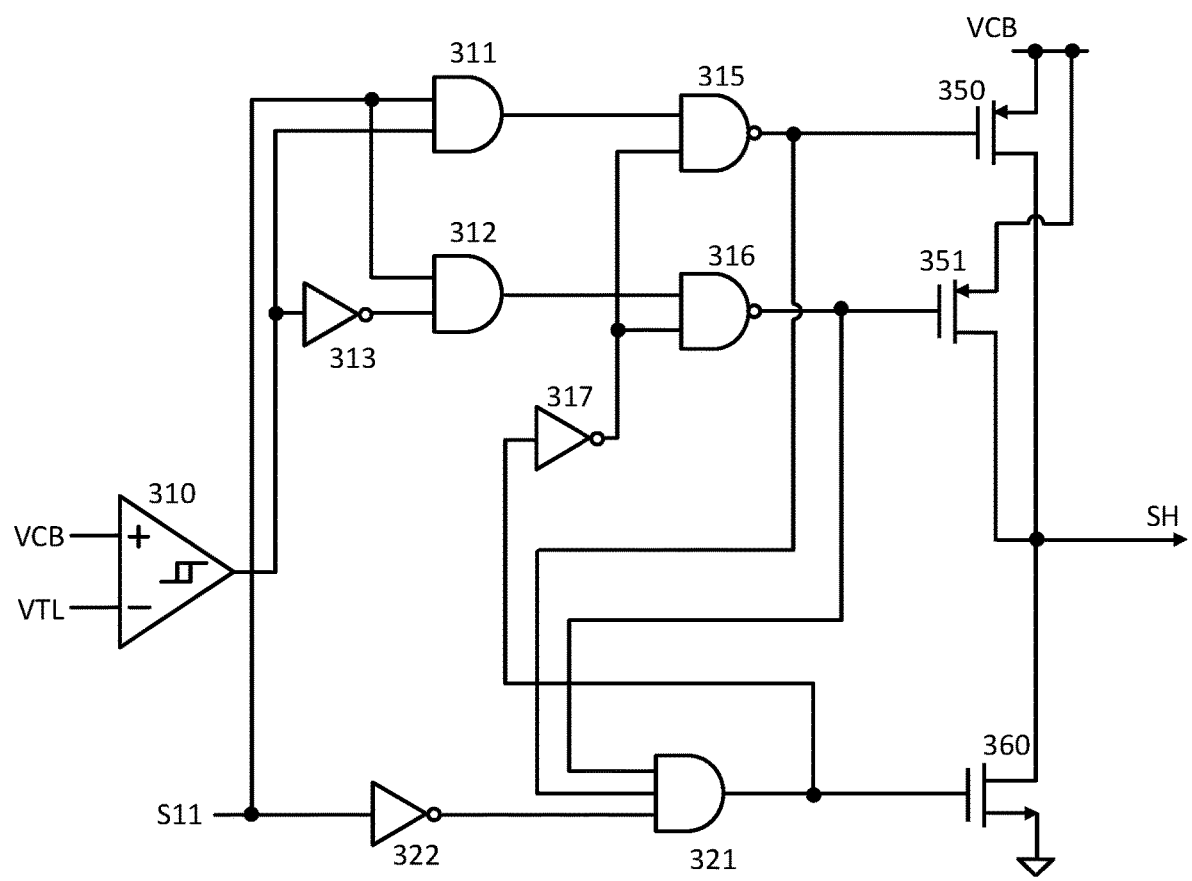
FIG. 2A and FIG. 2B show schematic diagrams of embodiments of the high-side drive circuit of the resonant power converter according to the present invention.
Figure 2B:
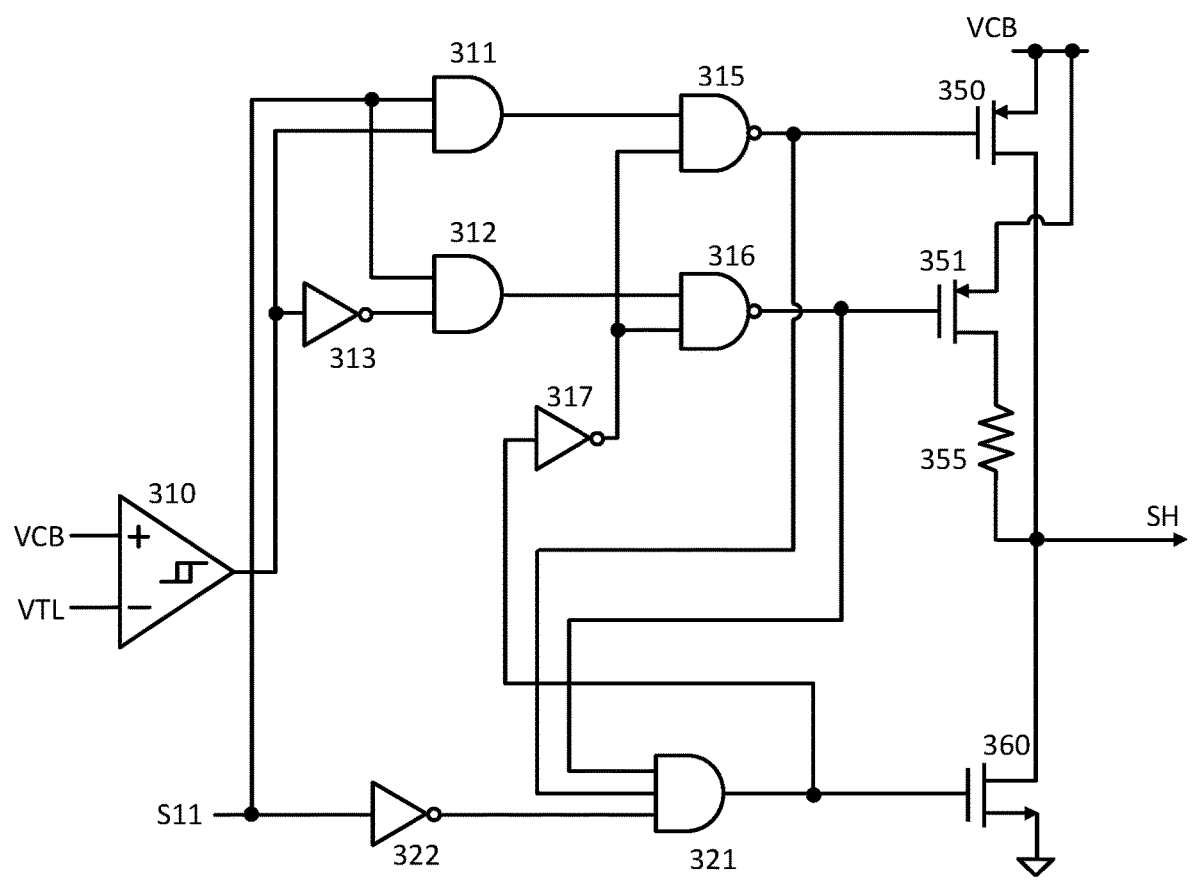

FIG. 2A and FIG. 2B depict preferred embodiments of the high-side drive circuit 300 in accordance with the present invention. When the high-side control signal S11 is logic-high (i.e., enabling state), a comparator 310 (with hysteresis) is activated to turn on transistor 350 if the bias voltage VCB exceeds the threshold voltage VTL. Conversely, if the bias voltage VCB is below the threshold voltage VTL, the comparator 310 is activated to turn on transistor 351. In one embodiment, the transistor 351 can be a high-resistance transistor. In one embodiment, the on-resistance of the transistor 351 is higher than the on-resistance of the transistor 350. To further achieve a slow slew rate for turning on transistor 30, in one embodiment, a high-resistance resistor 355 (as shown in FIG. 2B) is connected in series with transistor 351, resulting in the generation of the SH signal with the slow rate. A transistor 360 is utilized to deactivate the SH signal based on the high-side control signal S11.

Figure 3:
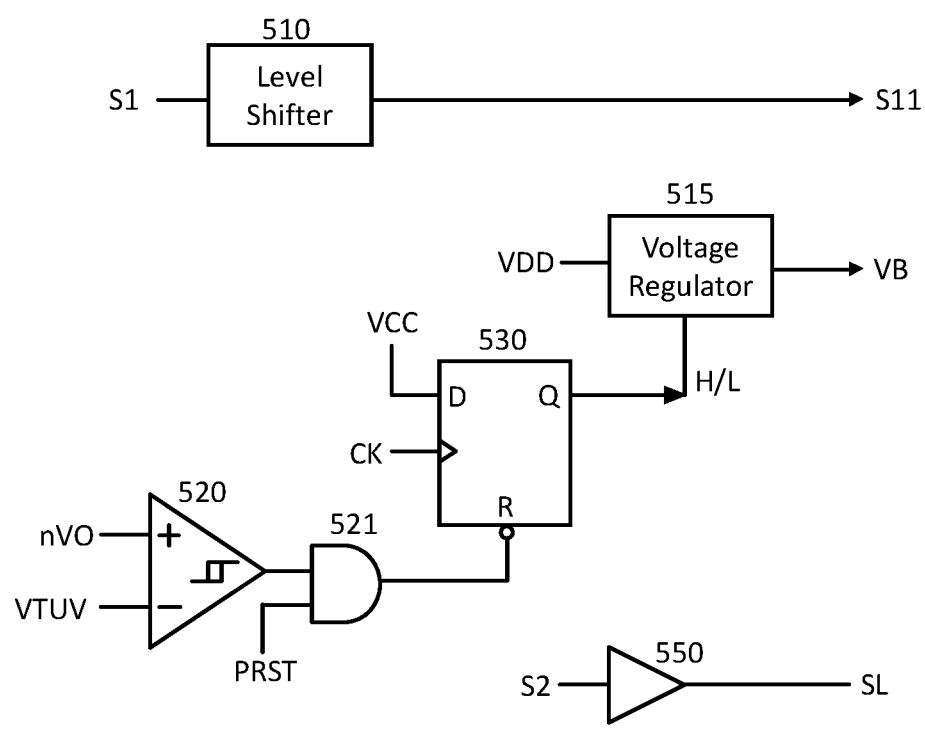
FIG. 3 shows a schematic diagram of an embodiment of the conversion control circuit of the resonant power converter according to the present invention.

FIG. 3 illustrates a preferred embodiment of the circuit that generates the signals S11, SL, and the bias voltage VB according to the present invention. In this embodiment, the primary-side controller 200 generates the bias voltage VB, which is lower than the threshold voltage VTL, if the output voltage VO of the power converter is below an under-voltage threshold. A comparator 520 (with hysteresis) is connected to reset a flip-flop 530 when the voltage nVO is below the threshold VTUV. The voltage nVO is sampled from the VAUX signal, which is correlated to the voltage level of the output voltage VO. Additionally, a power-on reset signal PRST is connected to reset the flip-flop 530. The flip-flop 530 generates an H/L signal, which is then connected to a voltage regulator 515 to generate the bias voltage VB below the threshold voltage VTL if the flip-flop 530 is reset. A high-side control signal S1 generates the high-side control signal S11 through a level-shifter 510, while a low-side control signal S2 generates the signal SL through a buffer 550.

On the other hand, when the voltage nVO exceeds the threshold VTUV, the voltage regulator 515 generates the bias voltage VB, which is higher than the threshold voltage VTL.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. As another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:

1. A resonant power converter comprising:
   a high-side switch and a low-side switch, coupled to form a half-bridge switching circuit which is configured to switch a transformer for generating an output voltage;
   a high-side drive circuit, generating a high-side drive signal coupled to drive the high-side switch in response to a high-side control signal;
   a bias voltage, coupled to a bootstrap diode and a bootstrap capacitor providing a power source from the bootstrap capacitor for the high-side drive circuit;
   wherein the high-side drive circuit generates the high-side drive signal with a fast slew rate to turn on the high-side switch when the high-side switch is to be turned on with soft-switching; the high-side drive circuit generates the high-side drive signal with a slow slew rate to turn on the high-side switch when the high-side switch is to be turned on without soft-switching.

2. The resonant power converter as claimed in claim 1, wherein the high-side drive circuit generates the high-side drive signal with the slow slew rate when the bias voltage is lower than a threshold voltage; when the bias voltage is higher than the threshold voltage, the high-side drive circuit generates the high-side drive signal with the fast slew rate.

3. The resonant power converter as claimed in claim 1, wherein turning on of the low-side switch generates a first circulated current which achieves soft-switching for the high-side switch when the low-side switch is turned off.

4. The resonant power converter as claimed in claim 2, further comprising a switching control circuit generating the bias voltage, wherein the switching control circuit is configured to generate the high-side control signal to control the high-side switch and a low-side control signal to control the low-side switch.

5. The resonant power converter as claimed in claim 2, wherein the bias voltage is controlled to be lower than the threshold voltage if the output voltage of the power converter is lower than an under-voltage threshold, such that the high-side drive signal has the slow slew rate.

6. The resonant power converter as claimed in claim 2, wherein the bias voltage is lower than the threshold voltage during a power-on period of the output voltage, such that the high-side drive signal has the slow slew rate.

7. The resonant power converter as claimed in claim 1, wherein the high-side drive circuit controls a path resistance between the power source and a control terminal of the high-side switch to have a first resistance when the slow slew rate is required to turn on the high-side switch, and to have a second resistance when the fast slew rate is required to turn on the high-side switch, wherein the first resistance is larger than the second resistance.

8. The resonant power converter as claimed in claim 7, wherein the high-side drive circuit includes:

plural transistors, coupled between the bias voltage and the control terminal of the high-side switch, wherein a first portion of the plural transistors is controlled to be conductive with the first resistance when the slow slew rate is required to turn on the high-side switch, and a second portion of the plural transistors is controlled to be conductive with the second resistance when the fast slew rate is required to turn on the high-side switch.

9. The resonant power converter as claimed in claim 8, wherein the plural transistors include a first transistor and second transistor, wherein the first transistor is controlled to be conductive when the slow slew rate is required to turn on the high-side switch, and the second transistor is controlled to be conductive when the fast slew rate is required to turn on the high-side switch, wherein an ON-resistance of the first transistor is larger than an ON-resistance of the second transistor.

10. The resonant power converter as claimed in claim 9, wherein the high-side drive circuit includes a resistor coupled to the first portion of the plural transistors, wherein the resistor is configured to increase the path resistance when the slow slew rate is required to turn on the high-side switch.

11. A conversion control circuit for controlling a resonant power converter, wherein the resonant power converter includes: a high-side switch and a low-side switch, coupled to form a half-bridge switching circuit which is configured to switch a transformer for generating an output voltage, wherein the conversion control circuit comprises:
a high-side drive circuit, generating a high-side drive signal coupled to drive the high-side switch in response to a high-side control signal;
a switching control circuit, configured to generate a bias voltage, the high-side control signal and a low-side control signal according to the output voltage, wherein the bias voltage is coupled to a bootstrap diode and a bootstrap capacitor for providing a power source from the bootstrap capacitor for the high-side drive circuit, wherein the low-side control signal is configured to control the low-side switch;
wherein the high-side drive circuit generates the high-side drive signal with a fast slew rate to turn on the high-side switch when the high-side switch is to be turned on with soft-switching, wherein the high-side drive circuit generates the high-side drive signal with a slow slew rate to turn on the high-side switch when the high-side switch is to be turned on without soft-switching.

12. The conversion control circuit as claimed in claim 11, wherein the high-side drive circuit generates the high-side drive signal with the slow slew rate when the bias voltage is lower than a threshold voltage; when the bias voltage is higher than the threshold voltage, the high-side drive circuit generates the high-side drive signal with the fast slew rate.

13. The conversion control circuit as claimed in claim 12, wherein the bias voltage is controlled to be lower than the threshold voltage if the output voltage of the power converter is lower than an under-voltage threshold, such that the high-side drive signal has the slow slew rate.

14. The conversion control circuit as claimed in claim 12, wherein the bias voltage is controlled to be lower than the threshold voltage during a power-on period of the output voltage, such that the high-side drive signal has the slow slew rate.

15. The conversion control circuit as claimed in claim 11, wherein the high-side drive circuit controls a path resistance between the power source and a control terminal of the high-side switch to have a first resistance when the slow slew rate is required to turn on the high-side switch, and to have a second resistance when the fast slew rate is required to turn on the high-side switch, wherein the first resistance is larger than the second resistance.

16. The conversion control circuit as claimed in claim 15, wherein the high-side drive circuit includes:
plural transistors, coupled between the bias voltage and the control terminal of the high-side switch, wherein a first portion of the plural transistors is controlled to be conductive with the first resistance when the slow slew rate is required to turn on the high-side switch, and a second portion of the plural transistors is controlled to be conductive with the second resistance when the fast slew rate is required to turn on the high-side switch.

17. The conversion control circuit as claimed in claim 16, wherein the plural transistors include a first transistor and second transistor, wherein the first transistor is controlled to be conductive when the slow slew rate is required to turn on the high-side switch, and the second transistor is controlled to be conductive when the fast slew rate is required to turn on the high-side switch, wherein an ON-resistance of the first transistor is larger than an ON-resistance of the second transistor.

18. The conversion control circuit as claimed in claim 17, wherein the high-side drive circuit includes a resistor coupled to the first portion of the plural transistors, wherein the resistor is configured to increase the path resistance when the slow slew rate is required to turn on the high-side switch.

19. A control method for controlling a resonant power converter, wherein the resonant power converter includes: a high-side switch and a low-side switch, coupled to form a half-bridge switching circuit which is configured to switch a transformer for generating an output voltage; and a high-side drive circuit, generating a high-side drive signal coupled to drive the high-side switch in response to a high-side control signal; wherein the control method comprises:
generating a bias voltage, wherein the bias voltage is coupled to a bootstrap diode and a bootstrap capacitor for providing a power source from the bootstrap capacitor for the high-side drive circuit;
generating the high-side control signal and a low-side control signal according to the output voltage, wherein the low-side control signal is configured to control the low-side switch;
controlling the high-side drive circuit to generate the high-side drive signal with a fast slew rate to turn on the high-side switch when the high-side switch is to be turned on with soft-switching; and
controlling the high-side drive circuit to generate the high-side drive signal with a slow slew rate to turn on the high-side switch when the high-side switch is to be turned on without soft-switching.

20. The control method as claimed in claim 19, wherein the step of generating the high-side drive signal includes:
controlling the high-side drive circuit to generate the high-side drive signal with the slow slew rate when the bias voltage is lower than a threshold voltage; and
controlling the high-side drive circuit to generate the high-side drive signal with the fast slew rate when the bias voltage is higher than the threshold voltage.

21. The control method as claimed in claim 20, wherein the step of generating the bias voltage includes:
controlling the bias voltage to be lower than the threshold voltage if the output voltage of the power converter is lower than an under-voltage threshold, such that the high-side drive signal has the slow slew rate.

22. The control method as claimed in claim 20, wherein the step of generating the bias voltage includes:
   controlling the bias voltage to be lower than the threshold voltage during a power-on period of the output voltage, such that the high-side drive signal has the slow slew rate.

23. The control method as claimed in claim 19, wherein the step of generating the high-side drive signal includes:
   controlling a path resistance between the power source and a control terminal of the high-side switch to have a first resistance when the slow slew rate is required to turn on the high-side switch; and
   controlling the path resistance to have a second resistance when the fast slew rate is required to turn on the high-side switch;
   wherein the first resistance is larger than the second resistance.

* * * * *